No. 824,793. PATENTED JULY 3, 1906.
T. W. JERREMS.
GRASS TWINE MACHINE.
APPLICATION FILED OCT. 22, 1904.

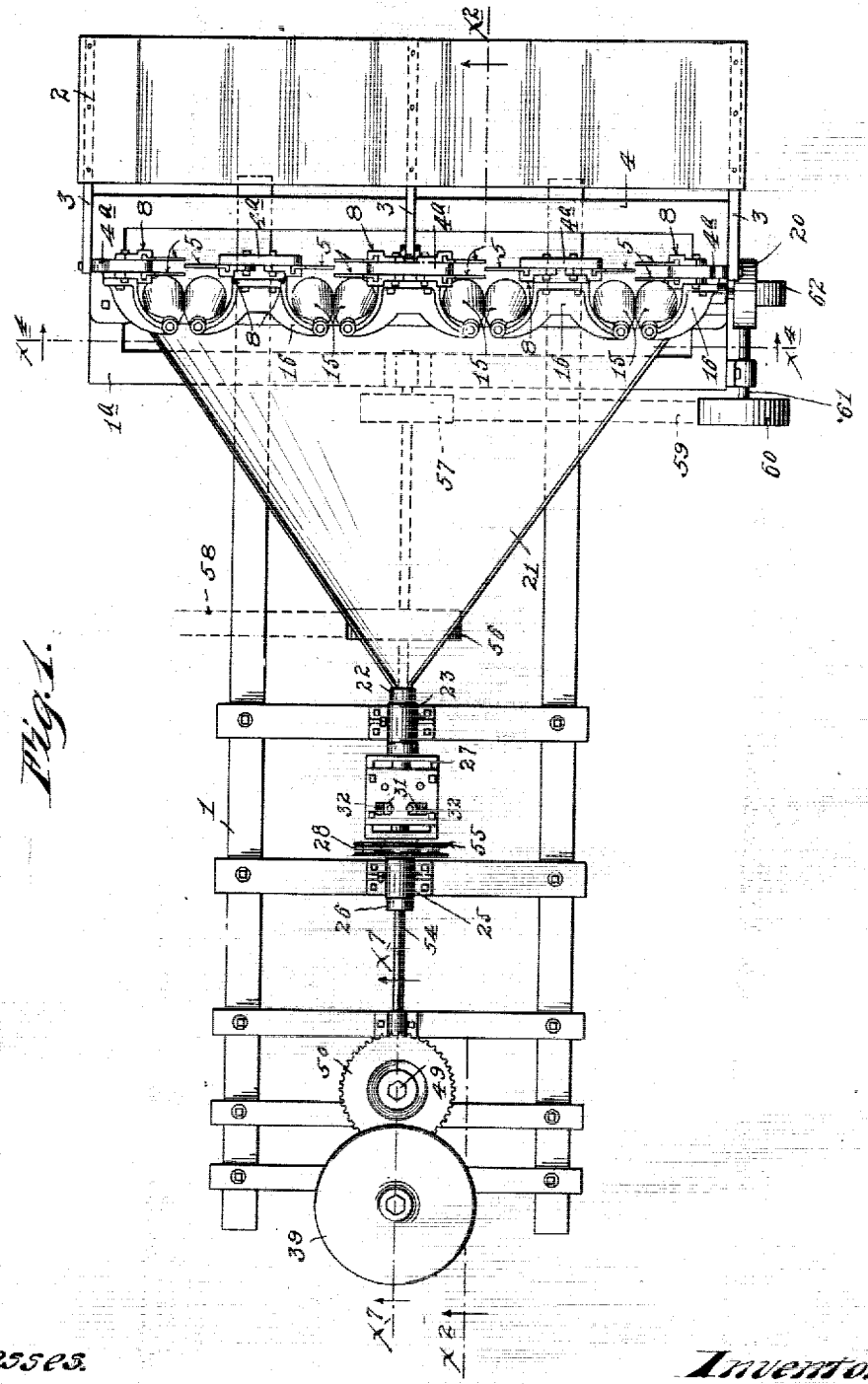

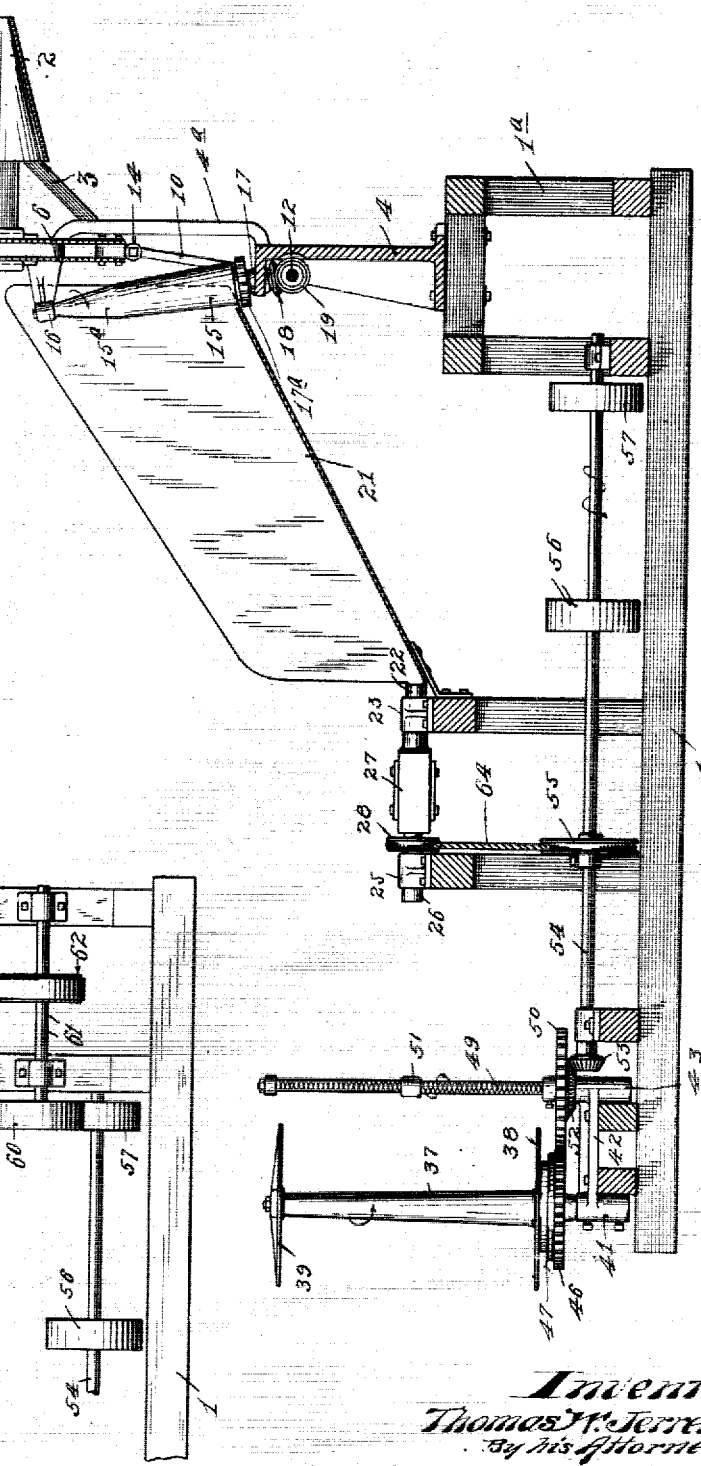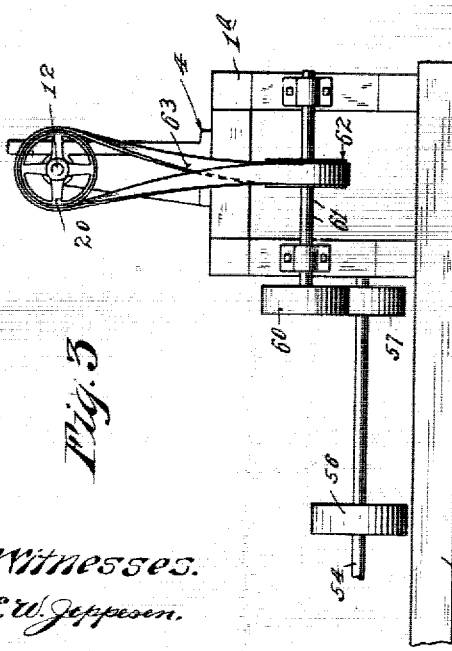

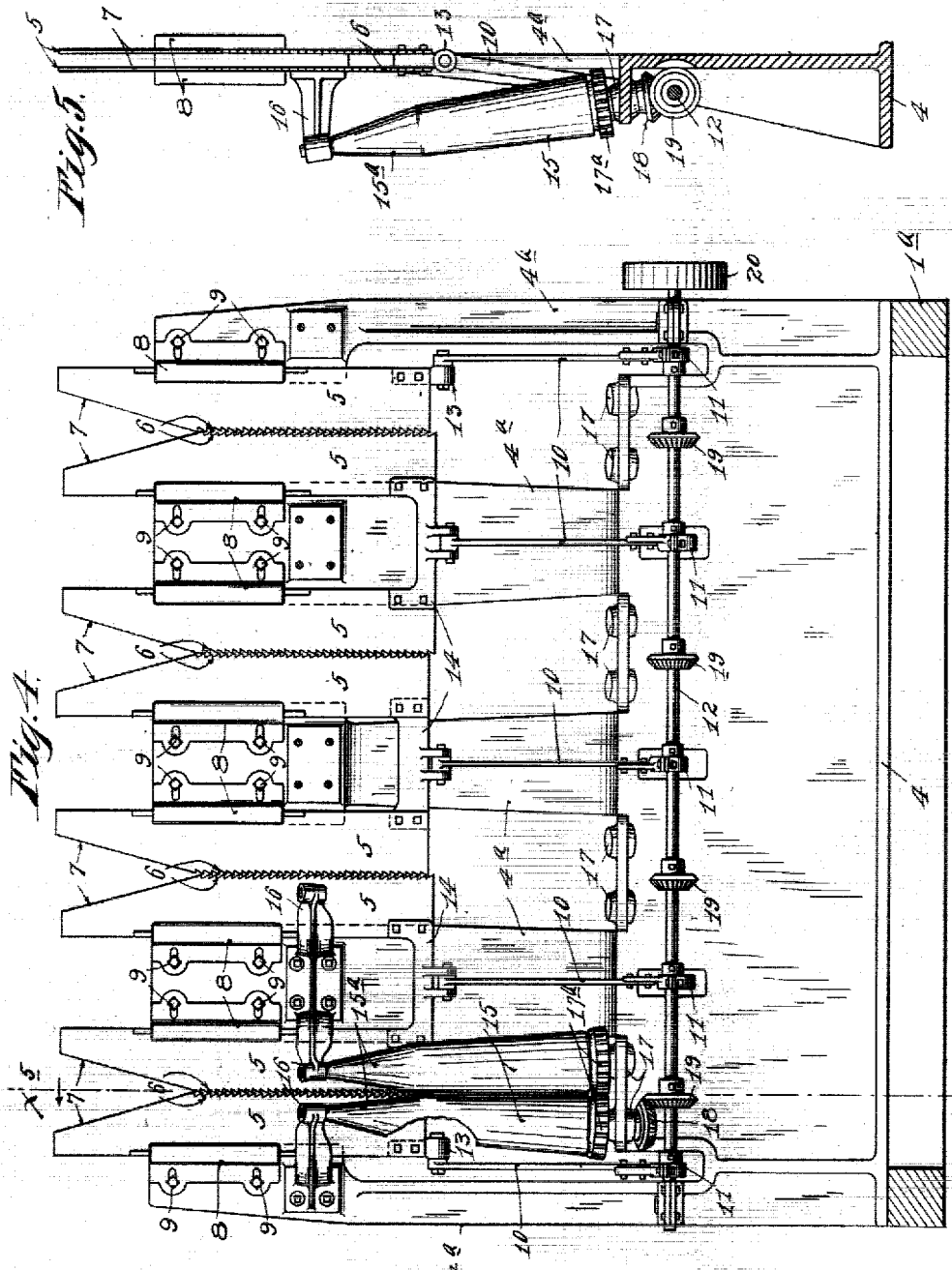

4 SHEETS—SHEET 4.

Witnesses:
E. W. Jeppesen
H. D. Kilgore

Inventor:
Thomas W. Jerrems
By his Attorneys
Williamson & Merchant

UNITED STATES PATENT OFFICE.

THOMAS W. JERREMS, OF ST. PAUL, MINNESOTA.

GRASS-TWINE MACHINE.

No. 824,793.   Specification of Letters Patent.   Patented July 3, 1906.

Application filed October 22, 1904. Serial No. 229,550.

*To all whom it may concern:*

Be it known that I, THOMAS W. JERREMS, a citizen of the United States, residing at St. Paul, in the county of Ramsey and State of Minnesota, have invented certain new and useful Improvements in Grass-Twine Machines; and I do hereby declare the following to be a full, clear, and exact description of the invention, such as will enable others skilled in the art to which it appertains to make and use the same.

My present invention has for its object to provide a simple and efficient machine especially adapted for making single-twist twine or rope from marsh-grass; and to such ends it consists of the novel devices and combinations of devices hereinafter described, and defined in the claims.

In my present machine I employ a plurality of grass selecting and feeding devices and arrange them to supply the grass-blades to a common twister by means of which all of the blades are twisted into a single strand. The number of feed devices which will be required will depend largely upon the size of the twine or rope which is to be formed by the single strand.

As a primary feed device or grass-selector I preferably employ mechanism of the class set forth and broadly claimed in my United States Letters Patent No. 745,625, issued to me of date December 1, 1903, entitled "Machine for making grass-twine." For coöperation with each primary feed device I employ secondary feed devices or rollers of the character disclosed and broadly claimed in my companion application, Serial No. 229,548, filed of even date herewith and entitled "Grass-twine machine."

In the accompanying drawings, which illustrate my invention, like characters indicate like parts throughout the several views.

Figure 6:
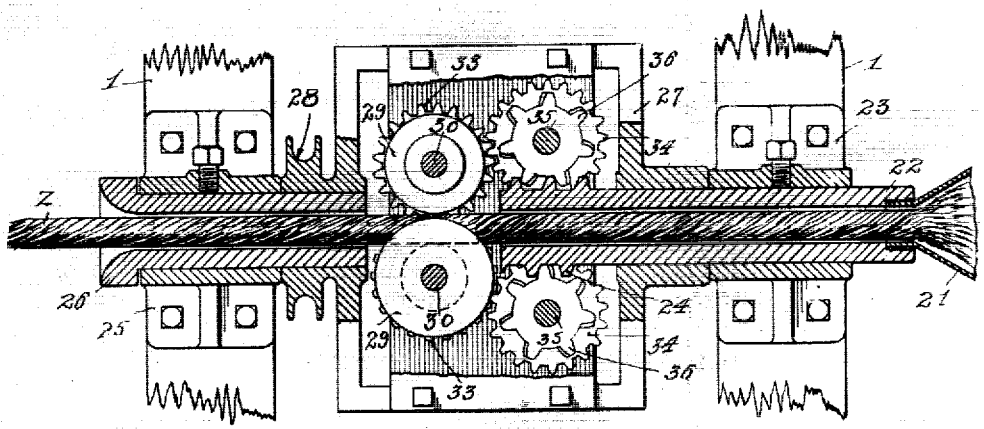
Figure 7:
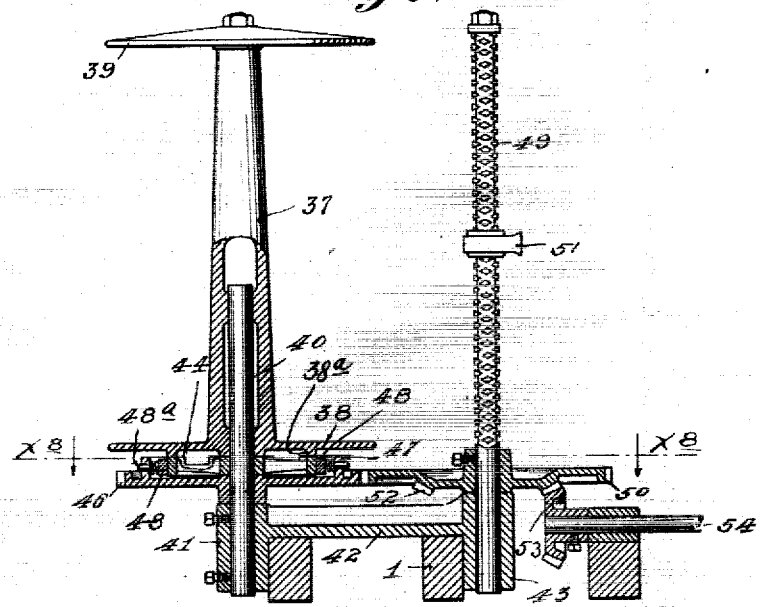
Figure 8:
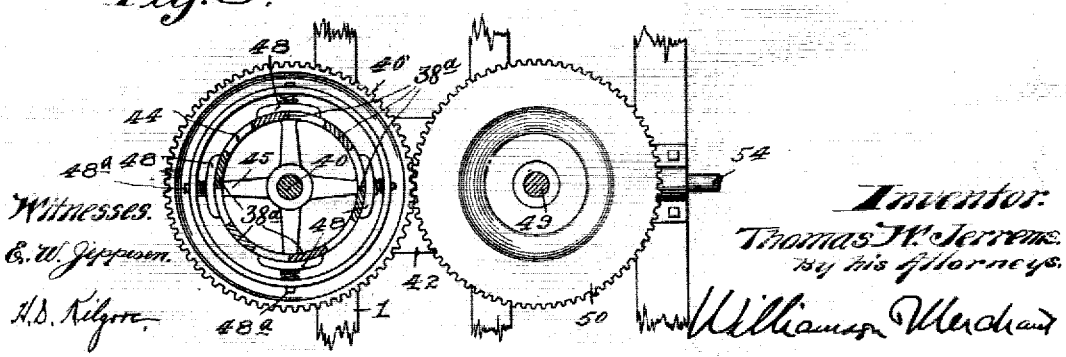

Figure 1 is a plan view showing a complete machine. Fig. 2 is a vertical section taken longitudinally through the machine approximately on the line $x^2 x^2$ of Fig. 1, some parts being left in full. Fig. 3 is a view in left side elevation, showing certain of the driving connections. Fig. 4 is a transverse vertical section taken approximately on the line $x^4 x^4$ of Fig. 1, some parts being broken away and others being removed. Fig. 5 is a vertical section on the line $x^5 x^5$ of Fig. 4. Fig. 6 is a view partly in plan, but principally in horizontal section, showing the construction of the combined twisting and drawing device. Fig. 7 is a view, partly in side elevation, but principally in vertical section, on the line $x^7 x^7$ of Fig. 1, illustrating the detail construction of parts of the reeling mechanism; and Fig. 8 is a horizontal section on the line $x^8 x^8$ of Fig. 7.

The numeral 1 indicates the framework of the machine, which at the head of the machine is provided with a transversely-extended section 1ª. In the present machine I have shown four so-called "primary feed devices" and four so-called "secondary feed devices," which devices are located in a transverse row, supported from the frame-section 1ª, and deliver to a common gathering-spout, which gathering-spout directs all the grass-blades to a common combined drawing device and twister. From the combined drawing device and twister the single strand of twisted twine or rope is wound upon a windlass-spool, which rotates on its own axis to wind up the rope or cord.

*Grass-holder.*—For each primary feed device or selector there is a grass-holder, and, as shown, the several grass-holders are afforded by a transversely-extended hopper-plate 2, having a plurality of depressions and rigidly supported by brackets 3 from a pedestal-bearing 4, which latter is rigidly secured on the frame-section 1ª.

*Feed mechanism.*—The so-called "pedestal-bearing" 4 is formed with a plurality of laterally-spaced vertical sections 4ª and with intervening gaps. Each primary feed device, as illustrated in the drawings, comprises three vertically-disposed feed-blades 5 or bars which have serrated inner or opposing edges 6 and upwardly-diverging edge surfaces 7 above said serrations. At one side two of the feed-blades 5 are located parallel to each other, but are spaced apart laterally, while the one coöperating blade on the other side is so located that it works in a plane passing between the coöperating blades on the other side, as best shown in Fig. 1. The coöperating beveled edges 7 of said blades form an upwardly-diverging crotch which leads downward to the serrations 6 of said blades and is adapted to receive the butt-ends of the grass-blades, which are held in a loose bundle or bunch by the coöperating holder. The feed-blades 5 are guided for true vertical movements, as shown, by adjustable guide-boxes 8, that are secured to the pedestal-prongs 4ª by slot-and-screw connections 9. By adjustments of one of the guide-boxes 8 with respect to the other the distance which the serrations of the feed-bars will interlap may be varied, and the rate of feed of the grass-blades may be regulated accordingly.

The lower ends of the feed-blades 5 are connected by crank-rods 10 to cranks or eccentrics 11, carried by a transverse counter-shaft 12, journaled in suitable bearings on the pedestal-bracket 4, as best shown in Fig. 4. The two cranks or eccentrics which operate the opposite blades of a particular primary feed device or selector are set one hundred and eighty degrees apart. The outside crank-rods 10 are connected to the outside feed-blades 5 by bearing-heads 13, while the intermediate crank-rods 10 are connected to the blades of two adjacent feed devices by pronged heads 14. The cranks or eccentrics 11 have short throw, usually about one-half of an inch. The two blades 5, which stand side by side, are tied together so that they have common movements.

The upright rollers 15 of the secondary feed device have conical upper ends 15ª, that form the same with coöperating surfaces that diverge from each other and form crotches. The trunnions at the reduced upper ends of the rollers 15 are journaled in bearings 16, rigid on the prongs 4ª of the pedestal-bearing 4. The trunnions at the lower ends of said rollers are journaled in bearings 17 on said pedestal 4, and one of the lower trunnions of each pair of rollers is provided with a miter-gear 18, that meshes with a miter-gear 19 on the transverse counter-shaft 12. Said counter-shaft 12 is provided at one end with a pulley 20. Said rollers 15 carry intermeshing-gears 17ª.

The blades of grass, which are fed endwise by the several pairs of rollers 15, are delivered into an inclined rearwardly-converging concentrating-spout 21, by means of which they are delivered to a combined twister and drawing device, or, in other words, to the twine-forming mechanism proper.

*Combined twister and drawing device.*—By the concentrating-spout 21 the blades of grass are directed into a non-rotary guide-sleeve 22, which is fixed in a suitable bearing 23 on one of the transverse bars of the frame 1 and is provided at its rear end with a worm 24. Spaced apart axially from the sleeve 22 and fixed in a bearing 25 on a transverse bar of the frame 1 is a second non-rotary guide-sleeve 26. Mounted to rotate on the two sleeves 22 and 26, between the bearings 23 and 25, is a gear carrier or frame 27, of rectangular form, as shown, which is provided on one hub with a sheave 28.

That portion of the rope or single strand of twisted twine which is exposed between the two sleeves 22 and 26 passes between and is pressed by a pair of peripherally-grooved drawing-wheels 29, which are secured on stub-shafts 30, journaled in bearing-boxes 31, that are slidably mounted in the side plates of said frame 27 and are subject to springs 32. The springs 32 cause the wheels 29 to yieldingly press the rope z. The shafts 30 are provided with gears 33, that mesh with each other and with gears 34, that are carried by stub-shafts 35. The stub-shafts 35 are journaled in the side plates of the revolving-frame 27 and are provided with worm-gears 36, that mesh with the threads of the worm 24 of the non-rotary sleeve 22. With this construction it is evident that when the frame 27 is revolved the draw-wheels 29 will be revolved around the axis of the rope z, thereby twisting the same, and will be rotated on their own axes, thereby drawing the twisted rope rearward and toward the windlass-drum.

*Reeling mechanism.*—The windlass-spool onto which the finished rope is wound involves a spindle 37, having a fixed lower end head 38 and a detachable upper end head 39. The spindle fits loosely over a vertically-disposed shaft 40, which is rigidly secured at its lower end in a bearing 41 of a plate 42, which plate is rigidly secured to the frame 1 and is provided with another bearing 43 for a purpose which will presently appear. The lower end head 38 of the spool 37 is provided with a depending notched flange 38ª, that interlocks with notches in the annular rim 44 of a wheel 45, which wheel is loosely mounted on the shaft 40. Loosely mounted on said shaft 40, just above the bearing 41, is a spur-gear 46, which is provided with an annular flange 47. Spring-pressed friction-shoes 48 are interposed between the flange 47 and the notched rim of the wheel 45. Said shoes 48 are provided with short stems 48ª, that work through the flange 47 to cause said shoes to rotate with the gear 46.

The numeral 49 indicates a reversely-threaded shaft, the smooth lower end of which is loosely journaled in the bearing 43 above noted, and carries a spur-gear 50, that meshes with the gear 46. Working on the threaded portion of the shaft 49 is a traveling guide 51, through which the rope passes on its way to the spool. The said guide 51 and reversely-threaded shaft 49 constitute a deploy for guiding the rope and winding the same in layers on the spool. This deployer is of the standard construction, the operation of which is well understood, and hence requires no further description.

The spur-gear 50 carries a bevel-gear 52, that meshes with a bevel-pinion 53, carried by the rear end of a long counter-shaft 54, mounted in suitable bearings on the frame 1. This shaft 54 also carries, as shown, a sheave 55 and two pulleys 56 and 57. Motion is imparted to the counter-shaft 54 by a power-driven belt 58, (indicated by dotted lines in Fig. 1,) which runs over the pulley 56. A belt 59 runs over the pulley 57 and over a pulley 60, carried by a short counter-shaft 61, mounted in suitable bearings on the frame-section 1ª and provided with a pulley 62. A belt 63 runs over the pulley 62 and over the pulley 20 of the shaft 12. A belt 64 runs over the sheave 55 and over the sheave 28 of the revolving frame 27. It will thus be seen that all of the running parts of the machine receive motion from the counter-shaft 54.

*Operation.*—The grass in straight parallel arrangement is placed in loose bundles in the several depressions of the holder-plate 2, with the butt-ends resting in the crotches afforded by the diverging upper end surfaces 7 of the feed blades or bars 5 and with the butt-ends of said grass-blades overlying the conical upper ends 15ª of the feed-rollers 15. Under the rotary movement of the shaft 12 the feed-blades 5 will be reciprocated, and the grass-blades will be selected from the bottoms of the loose bundles in a regular order of succession and will be fed downward into engagement with the rollers 15. The conical upper ends 15ª of the said rollers guide the butt-ends of the grass-blades between the bodies of said rollers, and the said rollers when they engage the grass-blades feed them endwise. The several streams of grass which are simultaneously delivered by the several feed devices into the gathering-spout 21 are concentrated into a single stream and are directed through the non-rotary sleeve 22, thence between the drawing-wheels 29, and thence through the non-rotary sleeve 26, and from thence to the spool of the reeling device. As already stated, the drawing-wheels 29 by rotation on their own axes draw the rope rearward and by revolution with the frame 27 twist the grass-blades together into rope form. The rotary movements of the drawwheels 29 on their own axes determine the speed at which the twisted rope will be drawn rearward. The gear 46 is driven at such speed that it will wind the twisted rope onto the spool 37 when the coil is of its minimum size. As the coil on the spool increases in diameter the spool will be held back or retarded in respect to its rotation with the gear 46, this retarding movement being permitted by slippage between the loose wheel 45 and the spring-pressed friction-shoes 48 of the gear 46. It will thus be seen that the twisted rope is wound upon the spool 37 without having been given a chance to untwist. When the spool is filled, the head 39 thereof being removed, the coiled rope may be removed as an entirety and by suitable binding-cords may be held together, so that it may be handled or shipped as an entirety.

The machine described is especially designed for making single-twist grass-rope or very large grass-twine. This class of grass-rope is used for a great many different purposes, and a large amount of the same is used for making cores in the casting of large metallic water-pipes and similar bodies.

The machine described is of course capable of modification within the scope of my invention as herein set forth and claimed.

What I claim, and desire to secure by Letters Patent of the United States, is as follows:

1. In a grass-feeding device, a plurality of primary feeding devices and a plurality of secondary feeding devices, said primary feed devices involving opposing feed blades or bars having coöperating serrated edges, and said secondary feed devices involving coöperating pairs of upright rollers having coöperating upper end surfaces that diverge from each other and form grass-receiving crotches, substantially as described.

2. In a grass-feeding mechanism, a plurality of primary feeding devices and a plurality of secondary feeding devices, said primary feed devices involving opposing feed blades or bars having coöperating serrated edges, and said secondary feed devices involving upright pairs of rollers having coöperating upper end surfaces that diverge from each other and form grass-receiving crotches, and a single shaft having connections for reciprocating said feed-blades and for rotating said rollers, substantially as described.

3. The combination with a plurality of primary feeding devices and a corresponding plurality of secondary feeding devices, of a common twisting device, a gathering-spout delivering the grass-blades from all said secondary feeding devices to said common twisting device, and a reeling device receiving from said twisting device; said primary feed devices involving opposing feed blades or bars having coöperating serrated edges and diverging upper end surfaces, and said secondary feed devices involving upright rollers having conical upper ends, substantially as described.

In testimony whereof I affix my signature in presence of two witnesses.

THOMAS W. JERREMS.

Witnesses:
ROBERT C. MABEY,
FRANK D. MERCHANT.